Jan. 28, 1947.
C. F. WALLACE
2,415,067
ELECTRODES AND CELL
Filed Aug. 18, 1939
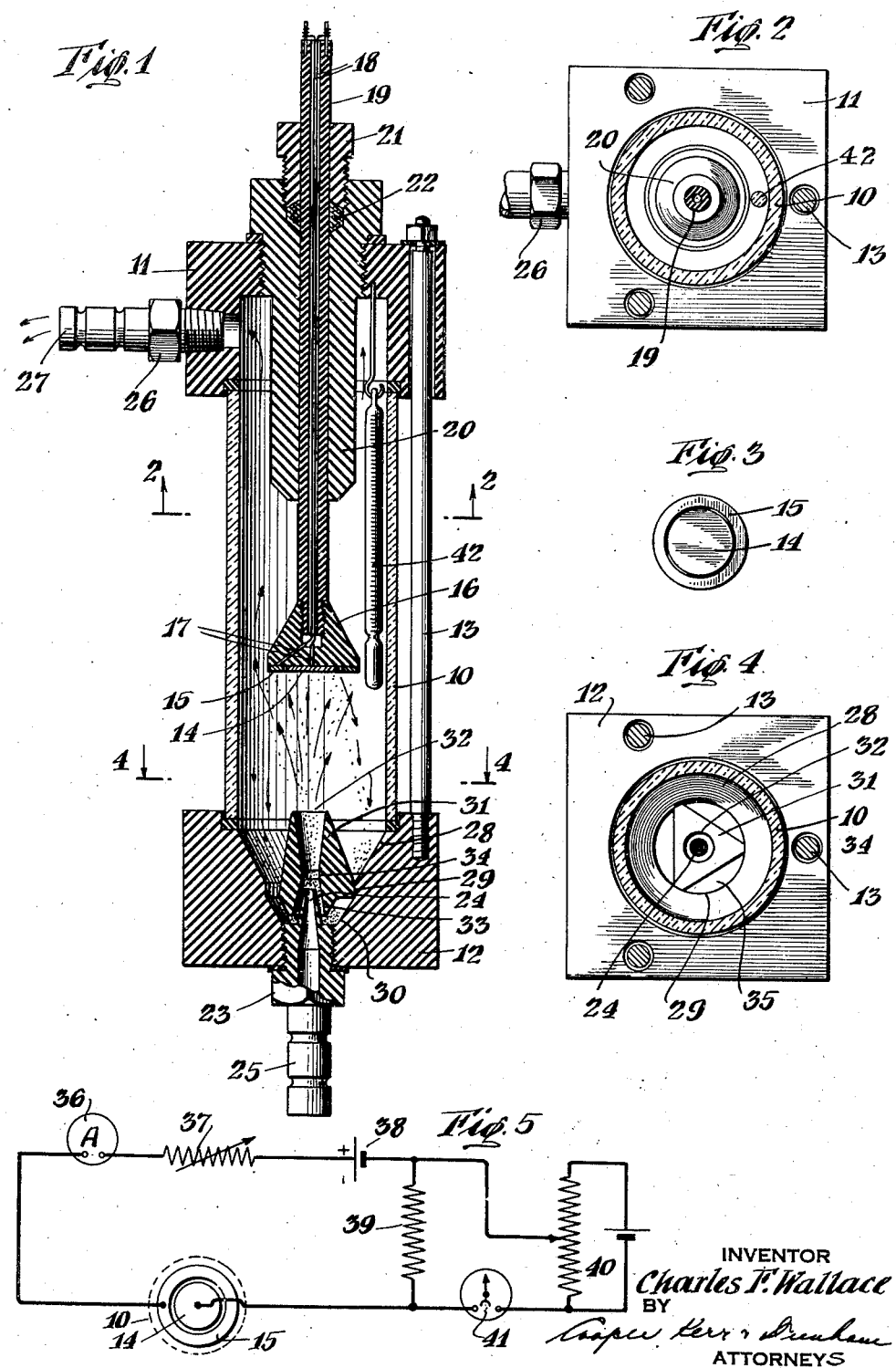
INVENTOR
*Charles F. Wallace*
BY
*Cooper, Kerr & Dunham*
ATTORNEYS Patented Jan. 28, 1947

2,415,067

UNITED STATES PATENT OFFICE 2,415,067

ELECTRODE AND CELL

Charles F. Wallace, Westfield, N. J., assignor to Wallace & Tiernan Products, Inc., Belleville, N. J., a corporation of New Jersey Application August 18, 1939, Serial No. 290,841

4 Claims. (Cl. 204—195)

This invention relates to a method of and means for maintaining electrode surfaces in a desired condition for operation in contact with a liquid, and to novel forms of electrodes.

One of the objects of the invention is to provide a method of maintaining one or more liquid-contacting electrode surfaces in a desired condition for electrical operation.

Another object is to provide means for maintaining one or more liquid contacting electrode surfaces in a desired condition for electrical operation.

A further object is to provide novel forms of electrodes.

An additional object is to provide a novel form of cell in which the electrodes are maintained in a desired condition during their electrical operation in contact with a liquid.

Other objects and advantages of my invention will appear to those skilled in the art upon reading the following description of the invention and of the manner and process of making, constructing, compounding, and using it, and I shall also explain herein what I now believe to be the principle thereof, and the best mode in which I have contemplated applying that principle.

Desiring to have it understood that my invention may be carried out by other means and with other apparatus, and that it may be used in other environments and for other purposes, I shall now proceed to describe what I now consider to be a preferred form of apparatus for practicing the invention.

Referring to the drawing:

Fig. 1 is an elevation, largely in section, of a novel form of cell embodying the invention.

Fig. 2 is a horizontal section taken on the line 2—2 of Fig. 1.

Fig. 3 is an inverted detail plan view of the exposed electrode surfaces.

Fig. 4 is a horizontal section taken on the line 4—4 of Fig. 1.

Fig. 5 is a wiring diagram illustrating a simple type of circuit in which the cell shown in Figs. 1 to 4 may be employed.

The particular cell shown comprises a housing or container consisting of an intermediate transparent glass tube 10 clamped between end plates or blocks 11, 12, of hard rubber, with interposed live rubber gaskets, the clamping being effected by a plurality of screw-threaded metallic rods or bolts 13.

The electrodes 14, 15, preferably of gold, are secured to the underside or base of a cone 16 of hard rubber. One of the electrodes, 14, is a circular disc and the other electrode, 15, is an annular disc whose smaller diameter is greater than the diameter of the first mentioned disc, with which it is concentric.

Electrically conductive leads 17 are each swaged to the top side of the electrodes 14, 15, and each electrically connected to a corresponding one of the leads 18 which extend through a hard rubber tube 19 which is screwed into the cone 16. The wires 18, 18 are insulated from each other except as they are electrically connected through a liquid bridging the electrodes 14, 15, or an external circuit to be connected to their upper ends.

The tube 19 extends through a sleeve 20, of hard rubber, and also a second sleeve 21, also of hard rubber, a suitable packing 22 being interposed between these two sleeves. The sleeve 20 is screw-threaded into the hard rubber end block 11 and the sleeve 21 is screw-threaded into the sleeve 20. Upon unscrewing the sleeve 21, the tube 19 may be slid vertically up or down, thereby adjusting the position of the electrodes 14, 15 in a vertical direction, and the desired position of adjustment is maintained by screwing the sleeve 21 into the sleeve 20 to cause the packing 22 to be compressed and grip the tube 19. A gasket of live rubber is interposed between the shoulder of the sleeve 20 and the upper side of the block 11. By unscrewing the sleeve 20, the electrode assembly may be removed from the container 10—11—12 for inspection or other purposes.

Liquid is introduced into the cell through the hard rubber fitting 23 which is screw-threaded into the lower end block 12, and which terminates in a nozzle 24 at its upper end and a hose-receiving connection 25 at its lower end.

Liquid leaves the cell through the hard rubber fitting 26, screw-threaded into the upper end block 11 and provided at its outer end with a hose-receiving connection 27.

When the parts are assembled, as shown, the container or housing 10—11—12 is liquid-tight, and no liquid can enter into or leave the inside of the housing except through the fittings 23, 26.

The block 12 is provided with an upwardly flaring frusto-conical opening 28, a cylindrical bore 29, and a second upwardly flaring frusto-conical opening 30. A Venturi member 31, of hard rubber, fixedly mounted in the cylindrical bore 29, is provided with a bore comprising oppositely directed frusto-conical openings 32, 33, terminating at their smaller diameters at the cylindrical opening or throat 34. The Venturi member 31 is exteriorly shaped somewhat in the form of triangular pyramids joined at their bases so as to provide openings 35 (see Fig. 4) through which material may pass or drop from the frusto-conical opening 28 into the frusto-conical opening 30.

The nozzle 24, in cooperation with the member 31 constitutes a venturi when liquid under suitable pressure or head is supplied through the fitting 23.

A suitable quantity of abrasive material is initially placed in the opening 30, or openings 28 and 30. The abrasive material consists of particles of Alundum, or garnet, or emery, or sand, or other suitable abrasive or scouring materials, or combinations of the same.

When liquid under suitable pressure is supplied to the fitting 23, a jet thereof issues from the nozzle 24 and impinges upon the lower or exposed surfaces of the electrodes 14, 15.

Abrasive material, by the action of the jet in the Venturi member 31, is automatically drawn into the opening 33 from the opening 30 and passes upwardly with the jet of liquid and impinges against the surfaces of the electrodes 14, 15 which are exposed to the liquid. The liquid fills the interior of the cell and overflows or exits through the fitting 26. The abrasive material, being heavier than the liquid, is not carried out at the overflow 26 but, after impinging against the electrodes 14, 15, drops downwardly into the frusto-conical opening 28, then passes through the openings 35 (see Fig. 4) into the opening 30, whence it is again drawn into the bore of the Venturi member 31. This operation is automatically carried on continuously as long as liquid under pressure is supplied to the fitting 25 and no additional abrasive material need be added to the cell unless and until it has lost its sharpness, when it may be replenished or wholly new abrasive substituted.

The degree of scouring or scrubbing action of the abrasive upon the exposed electrode surfaces is dependent upon the dimensions of the particular cell employed, the specific gravities of the liquid supplied to the cell and of the abrasive, the character of the abrasive, the velocity of the jet of liquid discharged from the nozzle 24 through the body of liquid within the cell, etc. These factors are co-related or regulated so as to effect the removal of undesired material that would otherwise collect upon the exposed surfaces of the electrodes 14, 15, but without grinding or scouring away to any objectionable extent, the material of the electrodes themselves.

One of the many uses to which the cell may be put is in the detection of the residual chlorine content of water undergoing treatment by chlorine or which has been treated with chlorine, and one of the numerous circuits that may be employed is shown in Fig. 5.

The cell shown in Figs. 1 to 4 is indicated merely diagrammatically in dotted lines in Fig. 5, the two electrodes 14, 15 being shown in full lines. The cell 10 is shown connected in a circuit including a microammeter 36, a variable resistance 37, a battery or cell 38, and a fixed resistance 39. Using a 1.5 volt cell 38, a variable resistor 37 of 5000 ohms, a fixed resistance 39 of 750 ohms, and a potentiometer 40 connected in series with a galvanometer 41 across the resistor 39, and supplying water containing residual chlorine to the cell 10, it was found that the current through the cell 10 was a function of the amount of residual chlorine in the water, rising as the residual chlorine content is increased and vice versa. The current passing through the cell 10 may be measured with a microammeter 36, or the drop of potential across the fixed resistor 39 may be ascertained by so adjusting the slide of the potentiometer that the galvanometer 41 reads zero. The polarizing current may be adjusted by the variable resistor 37 and set at any desired value with untreated water in the cell 10, and the readings of the meter 36, or the potentiometer 40, or both, correlated to the amounts or percentages of residual chlorine present in the water subsequently supplied to the cell 10.

The effect of the residual chlorine in the water supplied to the cell 10 is to effect electrode depolarization, and consequent current increase, to an extent depending upon the amount of residual chlorine in the water. The utilized effect is one of depolarization and not one of change in conductivity or resistance of the liquid in the cell. For example, the addition of salt to the water, increasing its conductivity many times, has a practically negligible effect. Change in temperature of the liquid flowing through the cell does, however, affect the readings. In Fig. 1, I have shown a thermometer 42 suspended within the cell so that the temperature of the liquid may be readily ascertained. If this temperature does not change substantially, the readings may be relied upon without effecting temperature-compensating adjustments or recalibration. Preferably, the cell 10 is operated below the decomposition voltage of the liquid therein.

The scouring or scrubbing action of the abrasive material upon the electrode surfaces has a marked effect in stabilizing the action and operation of the electrodes and the cell. Any dirt, slime, or other deleterious matter that would otherwise deposit or accumulate on one or the other, or both, of the exposed electrode surfaces, is effectively removed therefrom by the scouring or scrubbing action of the abrasive.

As stated, the invention may be practiced by apparatus other than the particular construction shown and it may be utilized for other purposes and in different environments. For example, suitably separated electrodes, each provided with a venturi for supplying liquid and abrasive thereto, may be employed in systems such as those disclosed in Letters Patent of the United States No. 1,944,803, patented January 23, 1934, on application filed by Georg Ornstein. Again, one of the electrodes with its venturi for supplying liquid and abrasive thereto, may be employed in combination with a reference half cell in systems such as that disclosed in Letters Patent of the United States No. 2,076,964, patented April 13, 1937, on application filed by Richard Pomeroy. My invention is especially adapted for use in systems, such as I have herein described, in which the effect utilized is a depolarization effect. However, it may also be used, with marked advantages, in indicating or control systems, or both, in which the effect detected is a change of conductivity of a liquid. Also, as indicated above, my invention may be employed in cells in which changes in electrical potential are to be detected and utilized. The electrodes may both be made of the same materials or of different materials, depending upon the conditions of use and other factors. One or more of the electrodes may be made of platinum or other suitable material.

Some of my inventions disclosed but not claimed herein are being claimed in my application being filed of even date herewith and entitled "Methods and systems of apparatus for detecting and controlling changes in composition of liquids," Serial No. 290,842, filed August 18, 1939.

The velocity of the liquid entering the cell 10 and carrying the abrasive particles, is preferably maintained substantially constant by any suitable pressure regulating or head regulating device so as not materially to affect the calibration of the cell. The vertical distance of the electrodes 14, 15 above the nozzle 24 is maintained at a predetermined height so as not materially to affect the calibration of the cell.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted, without interfering with the more general results outlined, and the invention extends to such use within the scope of the appended claims.

What I claim is:

1. In a cell of the class described, in combination, a container, an electrode within said container, means for directing a jet of liquid against said electrode, and means including a Venturi device for introducing and entraining abrasive in the jet of liquid.

2. In electrical cell apparatus of the class described, in combination, a container, an electrode in said container above the bottom thereof, an abrasive-receiving receptacle in the container below the electrode, the container having an overflow above the electrode, means for introducing liquid under pressure through said abrasive-receiving receptacle and for causing entrained particles of the abrasive to engage the exposed electrode surface and thereupon to sink before reaching the overflow, said last-mentioned means comprising means projecting the entering liquid as a jet of liquid alone, against the electrode and with sufficient velocity to advance the abrasive particles against the electrode solely by the flow of the jet, a second electrode electrically associated to the liquid in the container, and means connected to said electrodes for detecting electrical effects representative of the chemical composition of the liquid.

3. A cell comprising in combination, a container having an outlet for liquid, a plurality of electrodes within the container and below the outlet thereof, a Venturi device below the electrodes, and an abrasive receptacle below the electrodes and in communication with said Venturi device.

4. In a cell of the class described, in combination, a plurality of concentric electrodes having their exposed surfaces in substantially the same plane, means for directing a stream of liquid against the exposed surfaces of the electrodes, and means for entraining particles of abrasive in the liquid in its passage toward the electrode surfaces.

CHARLES F. WALLACE.